United States Patent
Brookes et al.

(10) Patent No.: US 10,279,884 B1
(45) Date of Patent: May 7, 2019

(54) ENVELOPE FILM SUSPENDERS FOR HIGH-ALTITUDE BALLOONS

(71) Applicant: LOON LLC, Mountain View, CA (US)

(72) Inventors: Kyle Brookes, Redwood City, CA (US); Kevin Roach, Boulder Creek, CA (US)

(73) Assignee: Loon LLC, Mountain View, CA (US)

( * ) Notice: Subject to any disclaimer, the term of this patent is extended or adjusted under 35 U.S.C. 154(b) by 0 days.

(21) Appl. No.: 15/801,648

(22) Filed: Nov. 2, 2017

(51) Int. Cl.
*B64B 1/58* (2006.01)

(52) U.S. Cl.
CPC ..................................... *B64B 1/58* (2013.01)

(58) Field of Classification Search
CPC .... B64B 1/02; B64B 1/04; B64B 1/06; B64B 1/40; B64B 1/58; B64B 1/62
See application file for complete search history.

(56) References Cited

U.S. PATENT DOCUMENTS

| | | | | |
|---|---|---|---|---|
| 2,919,082 A * | 12/1959 | Winzen | ...................... | B64B 1/58 24/462 |
| 4,705,235 A * | 11/1987 | Regipa | ...................... | B64B 1/58 244/31 |
| 5,584,449 A * | 12/1996 | Kavanagh | ................. | B64B 1/62 244/152 |
| 9,027,874 B1 * | 5/2015 | Roach | ....................... | B64B 1/40 244/31 |
| 9,242,712 B1 * | 1/2016 | Ratner | ....................... | B64B 1/58 |
| 9,371,123 B2 * | 6/2016 | Roach | ....................... | B64B 1/58 |
| 9,422,048 B1 * | 8/2016 | Roach | ....................... | B64B 1/58 |
| 9,540,091 B1 | 1/2017 | MacCallum et al. | | |
| 9,580,161 B1 * | 2/2017 | Roach | ....................... | B64B 1/58 |
| 2004/0021037 A1 * | 2/2004 | Nachbar | ................... | B64B 1/02 244/125 |
| 2009/0002257 A1 | 1/2009 | de Jong et al. | | |
| 2015/0367928 A1 | 12/2015 | Crites | | |
| 2017/0129579 A1 | 5/2017 | de Jong | | |

* cited by examiner

*Primary Examiner* — Joseph W Sanderson
(74) *Attorney, Agent, or Firm* — Botos Churchill IP Law

(57) ABSTRACT

A high altitude or stratospheric balloon system may include a balloon envelope including envelope film, at least one tendon, and a suspender. The suspender may have a first end attached to the envelope film. The suspender is arranged to stretch such that the first end moves towards an equator of the balloon envelope as the balloon envelope pressurizes in order to control movement of the envelope film relative to the tendon and towards the equator as the balloon pressurizes.

20 Claims, 15 Drawing Sheets

US 10,279,884 B1

ENVELOPE FILM SUSPENDERS FOR HIGH-ALTITUDE BALLOONS

BACKGROUND

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

BRIEF SUMMARY

One aspect of the disclosure provides a system. The system includes a balloon envelope including envelope film, at least one tendon, and a suspender having a first end attached to the envelope film, the suspender being configured to stretch such that the first end moves towards an equator of the balloon envelope as the balloon envelope pressurizes in order to control movement of the envelope film relative to the tendon and towards the equator as the balloon pressurizes.

In one example, the first end is arranged to move away from an apex of the balloon envelope when the first end is moving towards the equator. In this example, the system also includes a second tendon and a second suspender having a first end attached to the envelope film, the second suspender being configured to stretch such that the first end of the second suspender moves towards the equator of the balloon envelope as the balloon envelope pressurizes in order to control movement of the envelope film relative to the second tendon towards the equator as the balloon pressurizes. In addition, the first end of the second suspender is arranged to move towards an apex of the balloon envelope when the first end of the second suspender is moving towards the equator. In this example, the system also includes a base plate system arranged at a base of the balloon envelope, and wherein a second end of the second suspender is attached to the base plate system. Further, the base plate system includes a mounting point, and wherein the second end of the second suspender is attached to the mounting point. In addition, the base plate system includes a mounting point, and wherein the second end of the second suspender is configured to loop around the mounting point. In addition or alternatively, the mounting point is a stud, and in addition, the second tendon is attached to the stud.

In another example, at least one point on the tendon is fixed relative to the envelope film. In this example, the at least one point is proximate to a midpoint of the tendon. In another example, the envelope film includes a sleeve arranged over the tendon, and wherein the first end is attached to the sleeve. In another example, the system also includes a top plate system, and wherein a second end of the suspender is attached to the top plate system. In this example, the top plate system includes a mounting point, and wherein the second end of the suspender is configured to loop around the mounting point. In addition, the mounting point is a stud, and in this example, the tendon is attached to the stud. In addition or alternatively, the suspender is configured to hold a gathered portion of the envelope film towards the top plate system and away from the equator prior to pressurization. In this example, the suspender is configured to allow the gathered portion of the balloon envelope film to move towards the equator during pressurization. In another example, the balloon envelope includes a plurality of gores and a doubler film attached to the plurality of gores, and wherein a second end of the suspender is attached to the doubler film. In another example, the balloon envelope includes a plurality of gores and a doubler film attached to the plurality of gores, and wherein the suspender is an extension from the doubler film.

DETAILED DESCRIPTION

Overview

Figure 1:
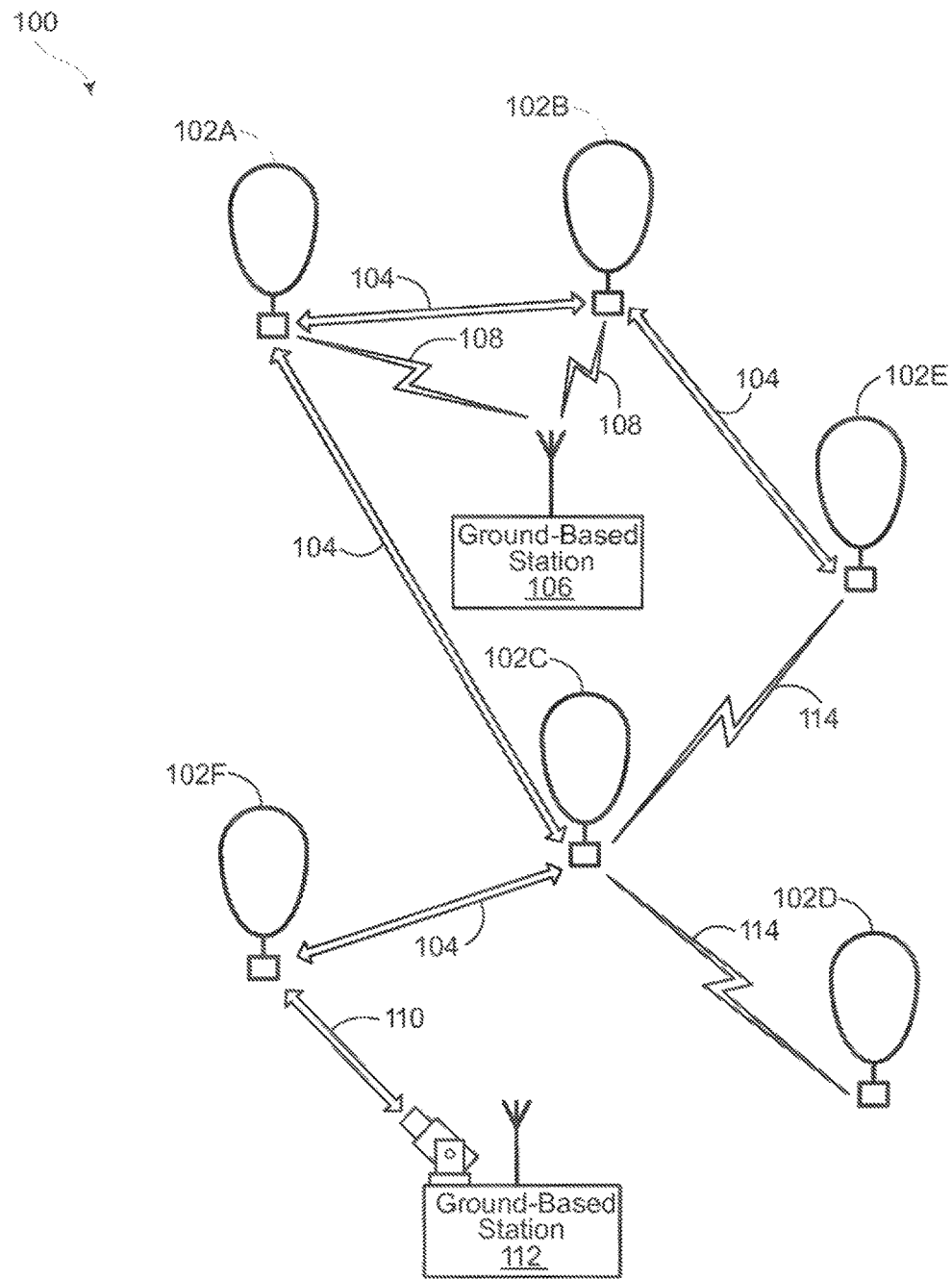
FIG. 1 is a functional diagram of a network in accordance with to aspects of the disclosure.

The technology relates to controlling the movement of balloon envelope film over tendons during pressurization of a stratospheric or high-altitude balloon. The tendons may be arranged within a tubing or a tubular sleeve of the same or similar material as the balloon envelope. Each end of each tendon is connected to a top plate and base plate arranged at the apex and base of the balloon envelope, respectively. The tendons thus provide support for the balloon envelope.

As balloon rises towards the stratosphere, the drop in temperature of around 80 degrees Celsius causes the envelope film to shrink, for instance around 1.5% or 150-180 ppm or more or less. However, the tendons do not have the same thermal rate of expansion, and in fact may not change much at all or even expand slightly due to stresses on the tendons. Because of this, the length of the envelope film between the top plate and base plate must be greater than the length of the tendons when the balloon is at ground level, for instance, at 20 degrees C. As the balloon envelope pressurizes and expands, the envelope film will move along the tendons, but the envelope film has a tendency to distribute itself unevenly causing unwanted strain at different points along the tendons.

To address this problem, tack points may be used to hold the envelope film to the tendons at several locations along each tendon. While this can provide adequate distribution of the envelope film along the tendons, it may be a painstaking and incredibly time consuming process.

As an alternative, breakaway tack points may be used. These tack points may be strong enough to handle launch at warm temperatures, but may break at very low pressure in the balloon, allowing the film to move downwards immediately prior to pressurization. However, the tack points may not all fail evenly and the film movements could be rather sudden.

As an alternative to using multiple tack points for each tendon, another approach may be to use a tether or leash. During pressurization, the envelope film may be pulled towards the equator of the balloon envelope and the force on the leash causes the leash to break. Again, because the envelope film tends to be pulled towards the equator during pressurization, the envelope film is more likely to be distributed evenly along the tendon. However, the leashes may have a tendency to break at different times which can create unwanted stress on the envelope film. To address this concern, the leashes may be made long enough to avoid having them break.

To avoid the difficulties in attaching the tack points and leashes as well as in having all of the breakable leashes and tack points for each tendon break at the same time in the same way, suspenders may be used. Each suspender may be attached to a stud of the top plate system or base plate system and to the balloon envelope either at the tubular sleeve of one of the tendons or the center of one of the gores. As an alternative, the suspenders may be attached to a doubler film near the apex of the balloon envelope.

Each suspender may be a single strap folded back on itself to form a loop of material configured to stretch, rather than break, as the envelope material is pulled towards the equator during pressurization. By using a loop, the suspender can be sealed to the tubular sleeve and looped around the stud making attachment much simpler than that of a leash or tack point discussed above. Alternatively, each suspender may be a single strap that is heat sealed to the envelope material at one end, and secured to a stud via an eye in the suspender.

The suspenders may be made of the same or similar materials as the material of the envelope film or any other low temperature, ductile viscoelastic materials. The geometry of the suspenders may be varied according to the amount of stretch required for the application.

The features described herein may allow for the controlled movement of balloon envelope film during pressurization of a stratospheric or high-altitude balloon. In addition, by using a loops of film material with a single tack point at or proximate to the equator, manufacture is greatly simplified as compared to the time consuming process of using multiple tack points. Moreover, using a suspender which stretches and gives avoids the unpredictable nature of the other approaches described herein.

Example Balloon Network

FIG. 1 depicts an example network 100 in which a balloon as described above may be used. This example should not be considered as limiting the scope of the disclosure or usefulness of the features of the films and balloon envelopes as described herein. For example, the films may be employed on various types of balloons, such as balloons carrying telescopes, surveillance gear, weather sensors or other types of standalone balloons or balloons used with other types of systems. In this example, network 100 may be considered a "balloon network." The balloon network 100 includes a plurality of devices, such as balloons 102A-F, ground base stations 106 and 112 and links 104, 108, 110 and 114 that are used to facilitate intra-balloon communications as well as communications between the base stations and the balloons. One example of a balloon is discussed in greater detail below with reference to FIG. 2.

Example Balloon

Figure 2:
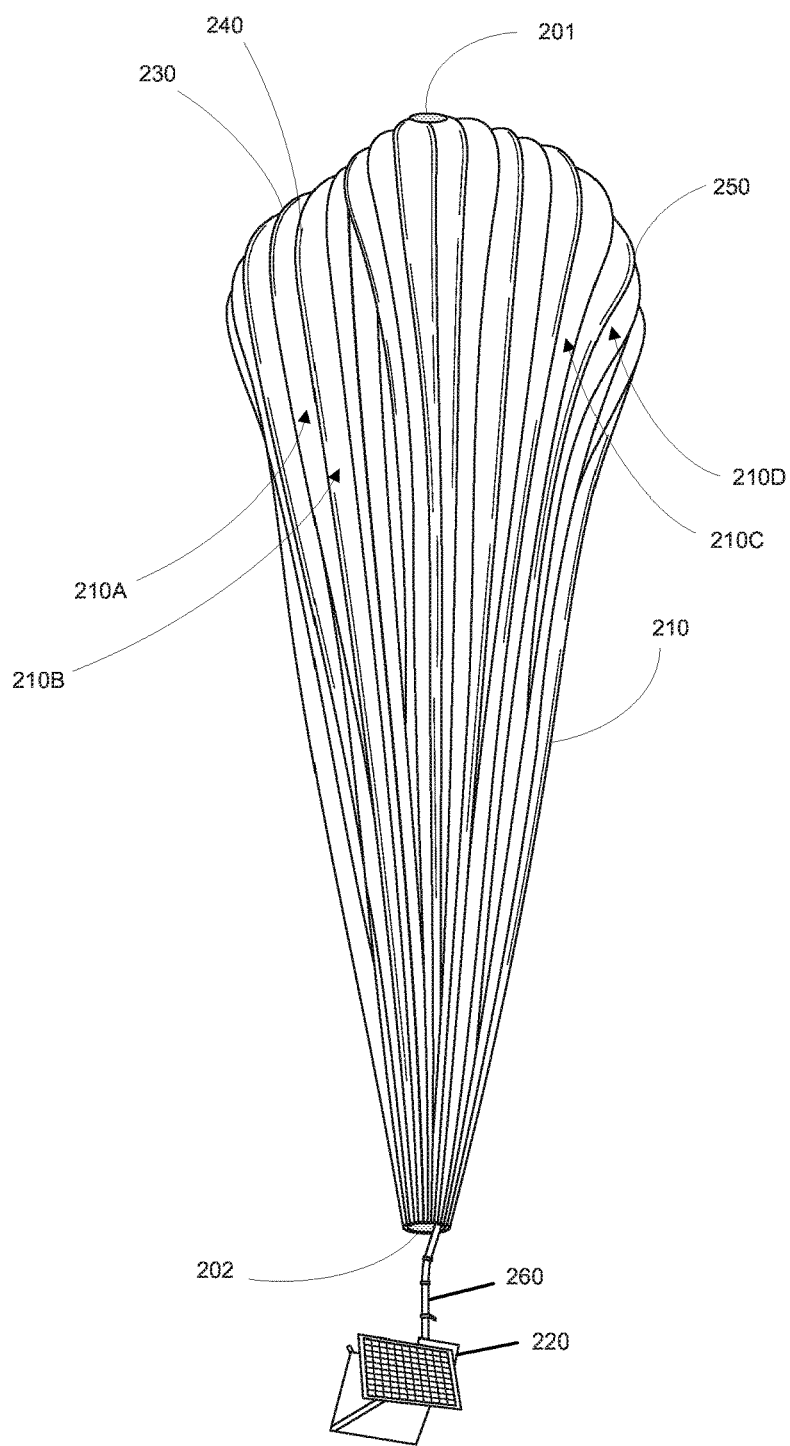
FIG. 2 is an example of a balloon in accordance with aspects of the disclosure.

FIG. 2 is an example stratospheric balloon 200, which may represent any of the balloons of balloon network 100. As shown, the balloon 200 includes a balloon envelope 210, a payload 220 and a plurality of tendons 230, 240 and 250 attached to the balloon envelope 210. In this example, balloon envelope 210 may be inflated to a desired level, but not yet pressurized.

The balloon envelope 210 may take various forms. In one instance, the balloon envelope 210 may be constructed from materials such as polyethylene that do not hold much load while the balloon 200 is floating in the air during flight. Further, the volume of the balloon envelope may be on the order of 2000 cubic meters. However, the shape and size of the balloon envelope 210 may vary depending upon the particular implementation. Additionally, the balloon envelope 210 may be filled with various gases or mixtures thereof, such as helium, hydrogen or any other lighter-than-air gas. The balloon envelope 210 is thus arranged to have an associated upward buoyancy force during deployment of the payload 220.

The payload 220 of balloon 200 is affixed to the envelope by a connection 260 such as a cable. The payload 220 may include a computer system (not shown), having one or more processors and on-board data storage. The payload 220 may also include various other types of equipment and systems (not shown) to provide a number of different functions. For example, the payload 220 may include an optical communication system, a navigation system, a positioning system, a lighting system, an altitude control system and a power supply to supply power to various components of balloon 200.

In view of the goal of making the balloon envelope 210 as lightweight as possible, it may be comprised of a plurality of envelope lobes or gores that have a thin film, such as polyethylene or polyethylene terephthalate, which is lightweight, yet has suitable strength properties for use as a balloon envelope. In this example, balloon envelope 210 is comprised of envelope gores 210A-210D. Although only a few gores are depicted in the example of balloon 200, a typical balloon may include as many as 30, 48, 60 or more or less gores.

Figure 3:
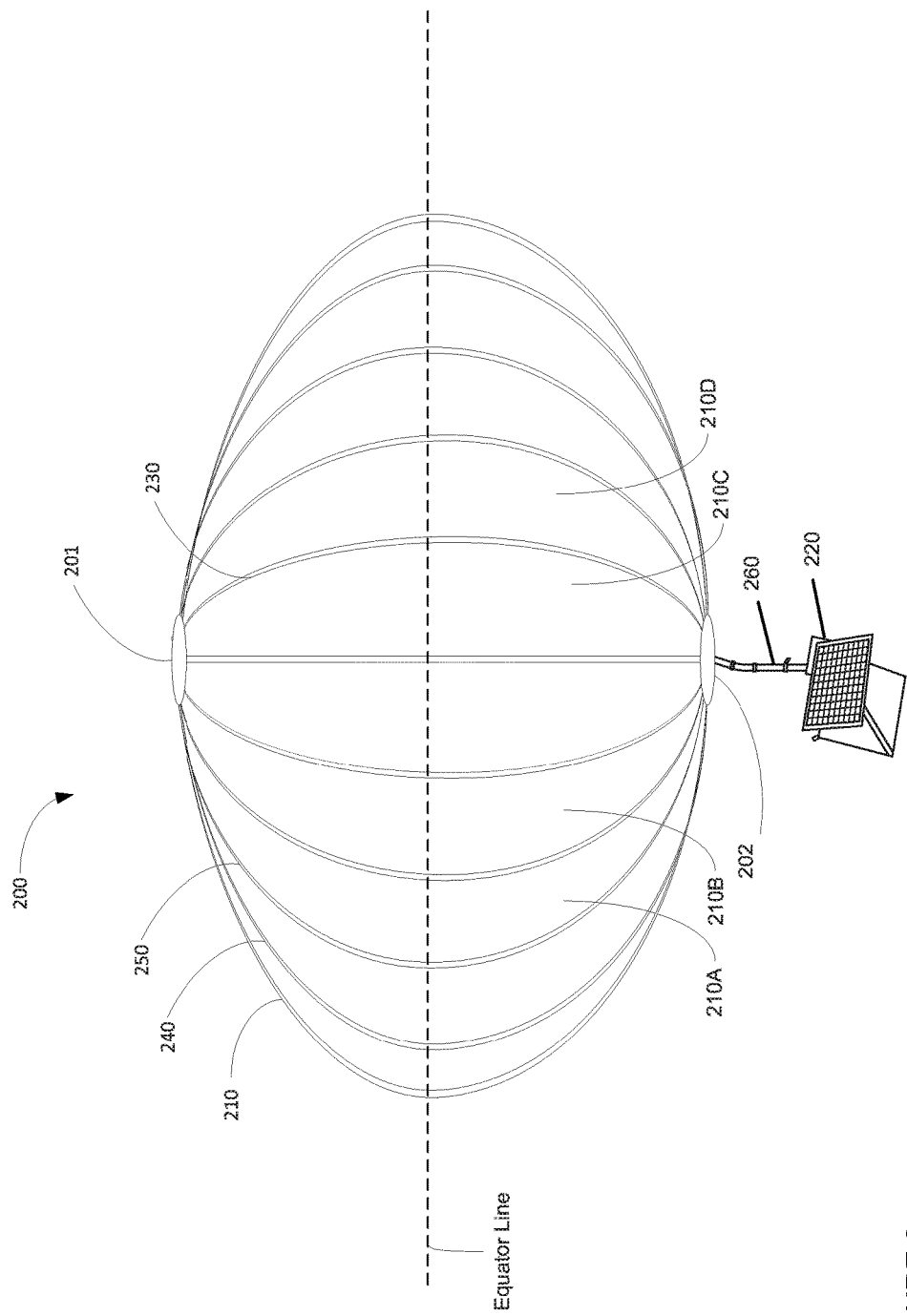
FIG. 3 is an example of a balloon in accordance with aspects of the disclosure.

Pressurized lift gas within the balloon envelope 210 may cause a force or load to be applied to the balloon 200. In that regard, the tendons 230-250 provide strength to the balloon 200 to carrier the load created by the pressurized gas within the balloon envelope 210. As shown more clearly in FIG. 3, depicting the balloon envelope 210 as being pressurized (i.e. in a nominal condition when floating in the stratosphere), the tendons are arranged along a centerline of each of the gores 210A-210B. Alternatively, the tendons may be arranged at the seams between the gores. In some examples, a cage of tendons (not shown) may be created using multiple tendons that are attached vertically and horizontally. Each tendon may be formed as a fiber load tape that is adhered to a respective envelope gore. Alternately, a tubular sleeve may be adhered to the respective envelopes with the tendon positioned within the tubular sleeve.

Top ends of the tendons 230, 240 and 250 may be coupled together using a type of plate, such as top plate system 201 positioned at the apex of balloon envelope 210. Each tendon may also be positioned within respective tubular sleeves which may be made of the same or similar material as the balloon envelope and attached to the balloon envelope by heat sealing to the midline of a gore or between two gores. Bottom ends of the tendons 230, 240 and 250 may also be connected to one another at base plate system 202. For example, a corresponding plate, e.g., base plate system 202, is disposed at a base or bottom of the balloon envelope 210. The top plate system 201 at the apex may be the same size and shape as and base plate system 202 at the bottom. Both plate systems include corresponding components for attaching the tendons 230, 240 and 250. In some examples, the top plate system 201 may serve a mounting point for certain systems attached to the balloon 200.

FIG. 2 depicts the balloon envelope 210 inflated with lift gas close to ground level, for instance, at atmospheric pressure. As the balloon rises and the atmospheric pressure drops, the lift gas within the balloon envelope expands, changing the shape of the balloon envelope. Eventually, for instance, when the balloon envelope reaches the stratosphere, the lift gas in the balloon envelope causes the balloon envelope to form more of a rounded pumpkin shape depicted in FIG. 3.

In some examples, manufacturing of the balloon envelope involves heat sealing portions of the film material in order to produce the gores. For instance, portions of film material which will form the gores may be laid out on a table and then sealed together, for example, using a heat bond. This heat bond of the film material can be employed using various techniques.

Figure 4A:
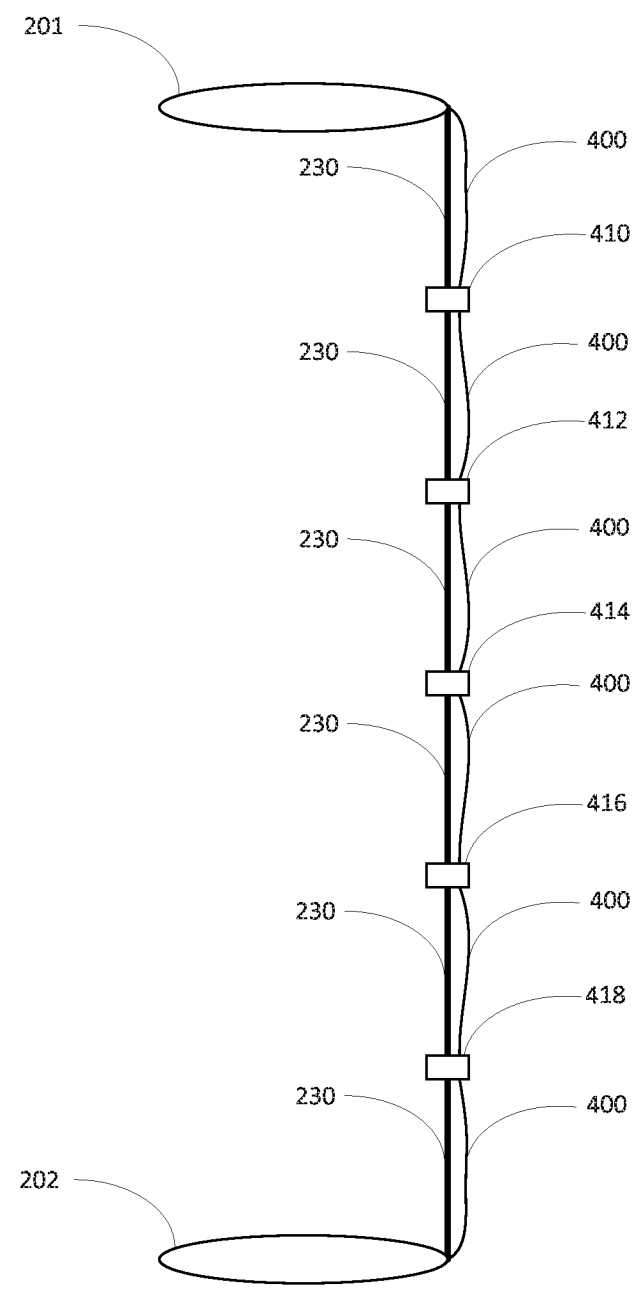
FIGS. 4A-4B are example representations of a top plate system and base plate system with a tendon attached to envelope film at a series of tack points in accordance with aspects of the disclosure.
Figure 4B:
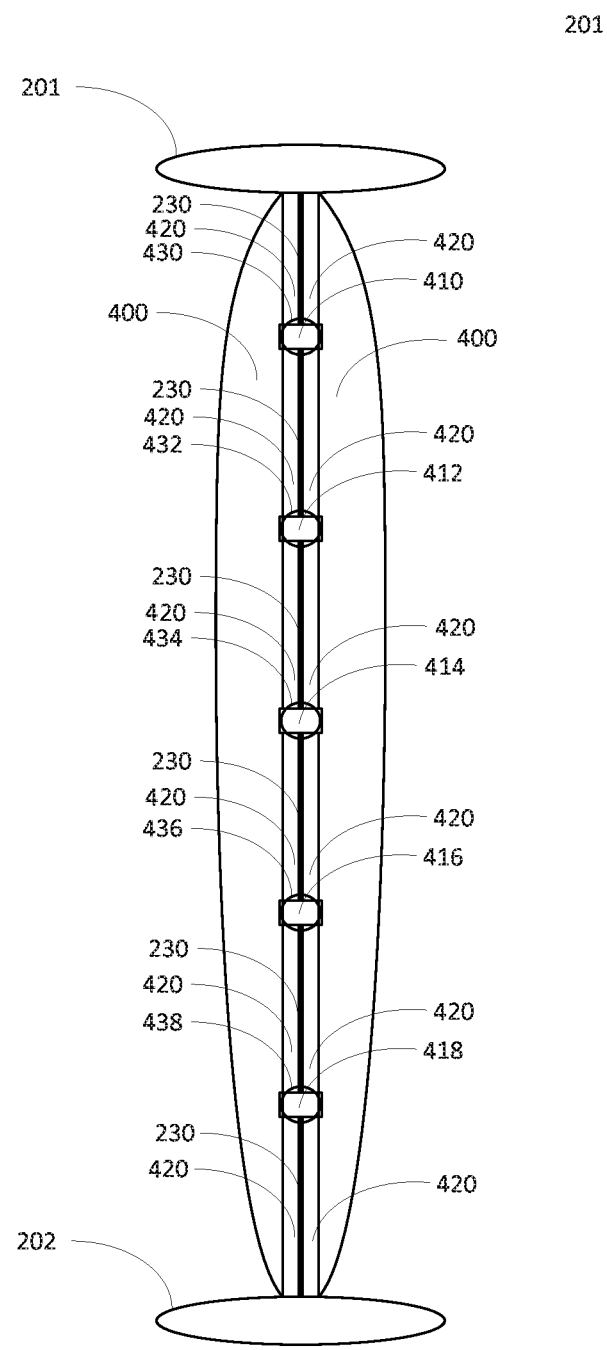

As noted above, tack points to hold the envelope film to the tendons at several locations along each tendon. FIG. 4A is a representation of top plate system 201 and base plate system 202 with a tendon 230 attached to envelope film 400 (of balloon envelope 210) via a series of 5 tack points 410, 412, 414, 416, 418. FIG. 4B is another representation of top plate system 201 and base plate system 202 with a tendon 230 attached to envelope film 400 (of balloon envelope 210) via the series of 5 tack points 410, 412, 414, 416, 418. In the example of FIG. 4B, tubular sleeve 420 is visible. Each of the tack points 410, 412, 414, 416, 418 may be evenly distributed along the tendon such that tack point 414 is located proximate to an equator of the balloon envelope (see equator line in FIG. 3). Although, only a single tendon is depicted for clarity, the balloon envelope may have 30, 48, 60 or more tendons, and each tendon may be attached to a respective tubular sleeve via a series of tack points.

To make a tack point, an opening may be cut into the tubular sleeve, and tape may be applied over the opening to hold the tendon to the tendon and balloon envelope. In this regard, FIG. 4B depicts a series of openings 430, 432, 434, 436, 438 in tubular sleeve 420 proximate to each tack point 410, 412, 414, 416, 418. In this regard, each tack point may correspond to a respective piece of tape and may have a respective corresponding opening.

In addition, between a pair of tack points or a tack point and a top or base plate, the amount of envelope film and length of tendon must be measured to a high degree of accuracy in order to distribute the envelope film as evenly as possible along the tendons when the balloon envelope is pressurized. While this may provide adequate distribution of the envelope film along the tendons, it may be a painstaking and incredibly time consuming process as some balloons may have 30, 48, 60 or more tendons and each tendon may requires 5 to 13 or more tack points.

As an alternative, breakaway tack points may be used. This may include using small strips of material such as envelope film or other plastic that are adhered around the tendon, for instance using tape or glue, and heat sealed to the tubular sleeve. This heat sealing may thus include melting the strip of material into the tubular sleeve. For instance, as an alternative to tape, tack points 410, 412, 414, 416, 418 may each correspond to a strip of material that is wrapped around tendon 230 and heat sealed to the tubular sleeve 420.

These breakaway tack points may be strong enough to handle launch at warm temperatures, such as between 20 and 30 degrees Celsius, but may break at very low pressure in the balloon, allowing the film to move downwards immediately prior to pressurization. These tack points may keep the material from slumping away from the apex due to gravity and causing the meridional or machine direction of the balloon envelope ("MD") load to be high at the plate, a known failure mode of balloons with uncontrolled film (i.e. film that does not move smoothly over the tendons during pressurization. However, the tack points may not all fail evenly and the film movements could be rather sudden.

Figure 5A:
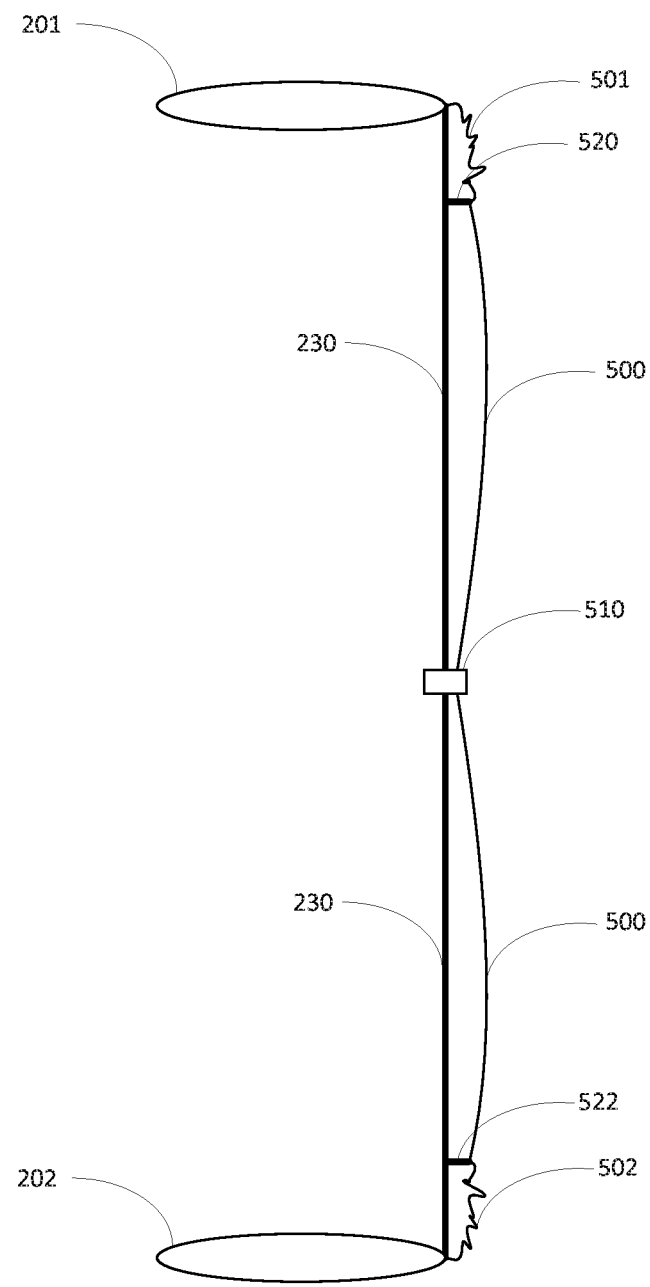
FIGS. 5A-5B are example representations of a top plate system and base plate system with a tendon attached to envelope film and a pair of leashes in accordance with aspects of the disclosure.
Figure 5B:
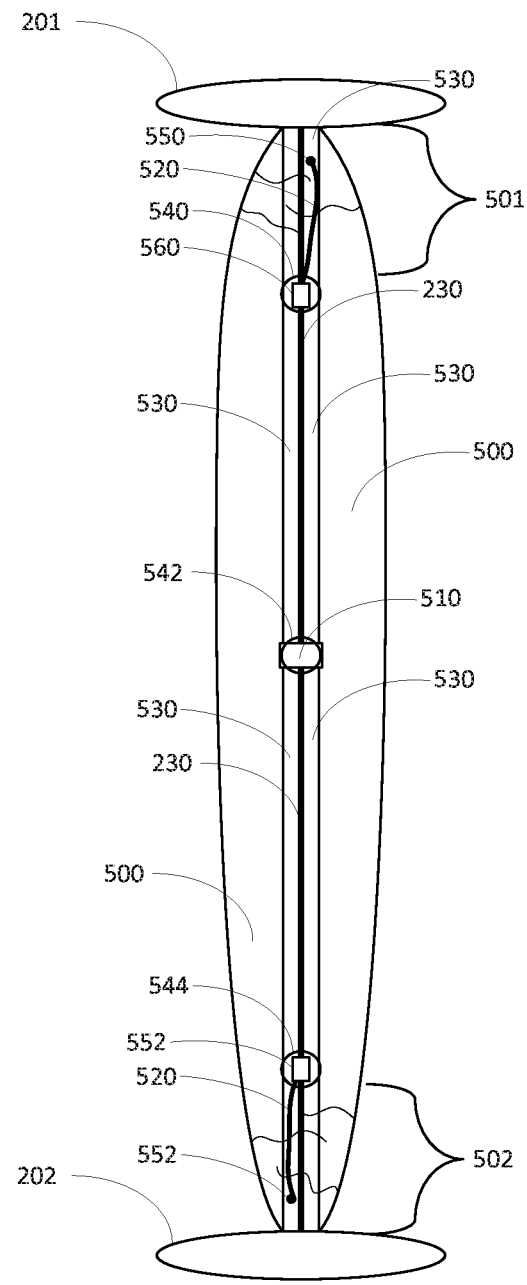

As an alternative to using multiple tack points for each tendon, another approach may be to use pairs of tethers or leashes for each tendon. FIG. 5A is a representation of top plate system 201 and base plate system 202 with a tendon 230 attached to envelope film 500 (of balloon envelope 210) via a tack point 510 as well as a pair of leashes 520, 522. FIG. 5B is another representation of top plate system 201 and base plate system 202 with a tendon 230 attached to envelope film 500 (of balloon envelope 210) via a tack point 510 as well as the pair of leashes 520, 522. In the example of FIG. 5B, tubular sleeve 530 and openings 540, 542, 544 are visible. As in the examples above, although, only a single tendon is depicted for clarity, the balloon envelope may have 30, 48, 60 or more tendons, and each tendon may be attached to a respective tubular sleeve via a pair of leashes similar to leashes 520, 522.

In this example, a single tack point may be placed at the longitudinal center or midpoint of the tendon and longitudinal center or midpoint of the envelope film (i.e. the equator). For instance, tack point 510 is proximate to or at the equator of the balloon envelope and the middle of tendon 230. The envelope film is then bunched towards the top plate system 201 and also towards the base plate system 202, or in other words, away from the equator. Thereafter, two leashes may be attached to the balloon envelope and the tendon by cutting open the tubing and sealing or taping one end of the leash to the inside of the tubing and another end of the leash to the tendon. Alternatively, the leash may be attached to the envelope film or tubular sleeve for instance, via heat sealing, taping, or gluing, without cutting.

As can be seen from FIGS. 5A and 5B, leashes 520, 522 are located proximate to the top plate system 201 and base plate system 202, respectively. Leash 520 holds a portion 501 of gathered envelope film 500 towards the top plate system 201 via a heat sealed attachment point 550 on the tubular sleeve 530 and tape 560 on the tendon 230. Leash 522 holds a portion 502 of gathered envelope film 500 towards the base plate system 202 via a heat sealed attachment point 552 on the tubular sleeve 530 and tape 562 on the tendon 230. Alternatively, one or both of attachment points 550, 552 may be located on a different portion of the envelope film, such as some point on one of the gores.

Figure 6:
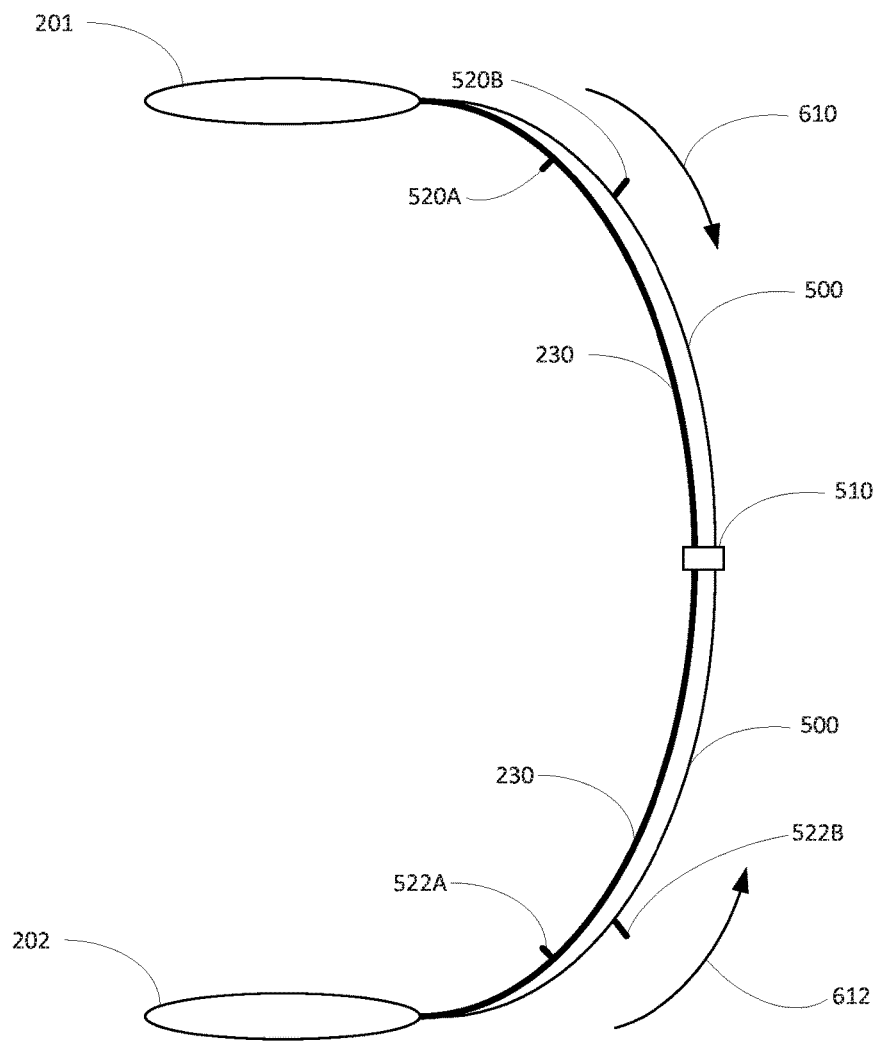
FIG. 6 is an example representation of a top plate system and base plate system with a tendon attached to envelope film and a pair of leashes for a pressurized balloon envelope in accordance with aspects of the disclosure.

During pressurization, the envelope film may be pulled towards the equator and the force on the leash causes the leash to break. For instance, turning to FIG. 6, the portions 501, 502 are pulled towards the equator in the directions of arrows 610 and 612, respectively, and are indistinguishable from the rest of the envelope film 500. Again, because the envelope film tends to be pulled towards the equator of the balloon during pressurization, the envelope film is more likely to be distributed evenly along the tendon 230. For instance, FIG. 6 depicts the example of FIGS. 5A and 5B where envelope film 500 is pressurized. Both leashes 520 and 522 have broken into leash portions 520A, 520B and 522A, 522B, respectively. As can be seen leash portion 520A remains attached to tendon 230, and leash portion 520B, 522B remain attached to the envelope film 500 (or more particularly, to the tubular sleeve 530, not shown).

Ideally, all of the leashes proximate to the top plate system will break close to or at the same time while all of the leashes proximate to the base plate system will break close to or at the same time. However, this timing is difficult to control, and thus, the leashes may have a tendency to break at different times which, in turn, can cause the film at two adjacent tendons to move towards the equator at different times creating diagonal folds in the envelope film which can create unwanted stress risers. To address this concern, the leashes may be made long enough to allow the leashes to stretch and avoid having the leashes break. For instance, the amount of stretch required may be as little as 30% of the total length of the leashes, while shorter leashes with more stretch may be preferred from a film control perspective, with as much as 200% elongation in the design theoretically being achievable.

Figure 7A:
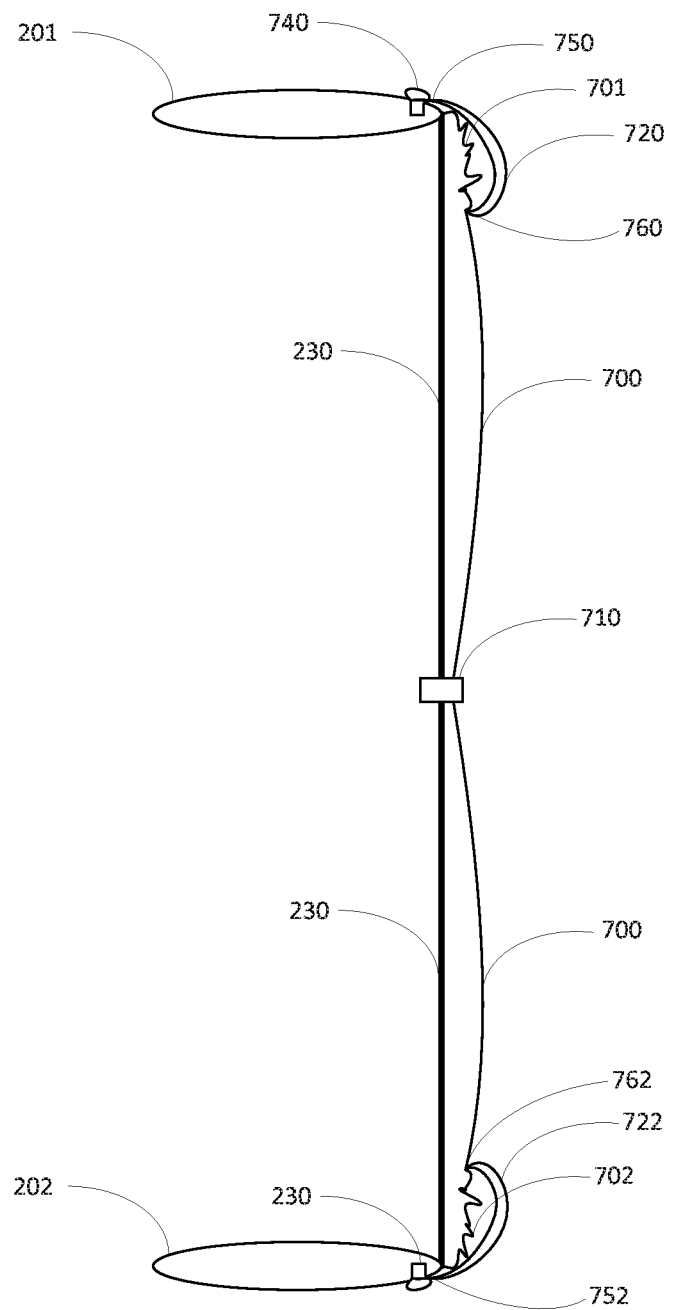
FIGS. 7A-7B are example representations of a top plate system and base plate system with a tendon and a pair of suspenders in accordance with aspects of the disclosure.
Figure 7B:
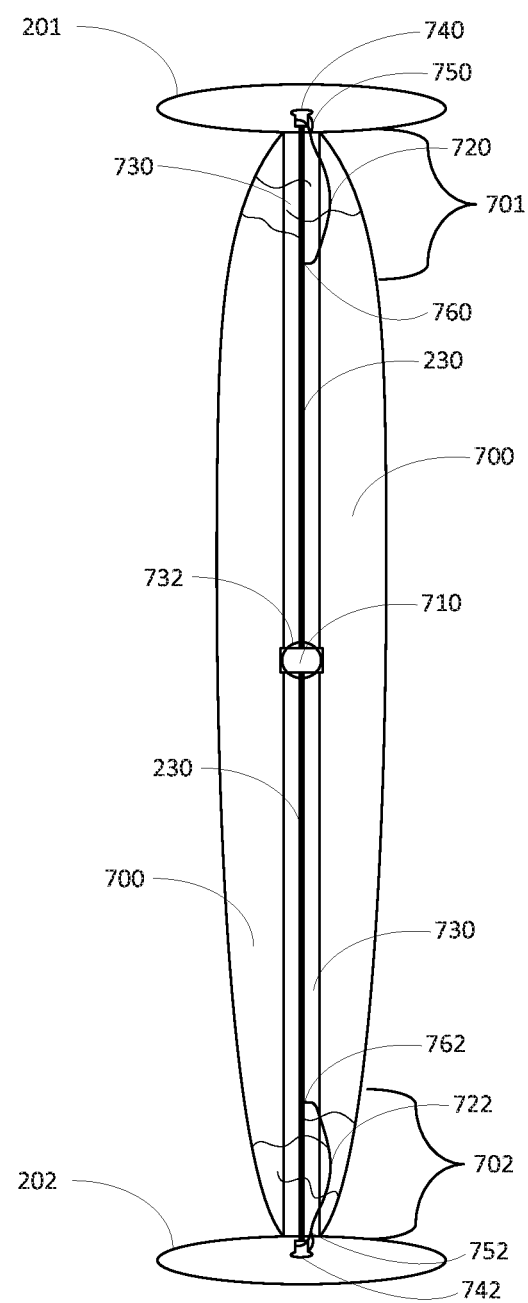

To avoid the difficulties in attaching the tack points and leashes as well as in having all of the breakable leashes and tack points for each tendon break at the same time in the same way, pairs of suspenders may be used. FIG. 7A is a representation of top plate system 201 and base plate system 202 with a tendon 230 attached to envelope film 700 (of balloon envelope 210) via a tack point 710 as well as a pair of suspenders 720, 722. FIG. 7B is another representation of top plate system 201 and base plate system 202 with a tendon 230 attached to envelope film 700 (of balloon envelope 210) via a tack point 710 as well as the pair of suspenders 720, 722. In the example of FIG. 7B, tubular sleeve 730 and opening 732 is visible. As in the examples above, although, only a single tendon is depicted for clarity, the balloon envelope may have 30, 48, 60 or more tendons.

Each suspender may be attached at one end to a mounting point of the plate system or base plate system. For instance, a first end 750 of suspender 720 may be attached to mounting point 740 of top plate system 201, while a first end 752 of suspender 722 may be attached to mounting point 742 of base plate system 202. For the suspenders attached to the top plate system, each suspender may share a mounting point with one or more other suspenders or may alternatively have its own respective mounting point. Similarly, for the suspenders attached to the base plate system, each suspender may share a mounting point with one or more other suspenders or may alternatively have its own respective mounting point. In this regard, one or more additional suspenders attached to other tendons of the balloon envelope may also be attached to the mounting point 740 and/or 742.

In one example, the mounting point may be a stud used to attach the tendons to the top plate system or base plate system. In this regard, the stud may be shaped to allow a tendon to be looped around or otherwise attached to the stud with a clamp, bracket, or other device. For instance, mounting points 740 and/or 742 may each be a stud as depicted in FIGS. 7A and 7B, only a single stud being depicted for clarity. As each tendon has its own respective stud on each of the top plate system and base plate system. If there is a suspender for each gores and/or tendons of the balloon envelope, in this example, each suspender may have it's own respective stud. Alternatively, two or more suspenders may be attached to a given stud.

Another end of each suspender may be attached to the envelope film either at the tubing of one of the tendons or the center of one of the gores. For instance, a second end 760, opposite of first end 750, of suspender 720 may be attached to the envelope film 700. Similarly a second end 762, opposite of first end 752, of suspender 720 may be attached to a portion 762 of the envelope film 700.

Figure 8C:
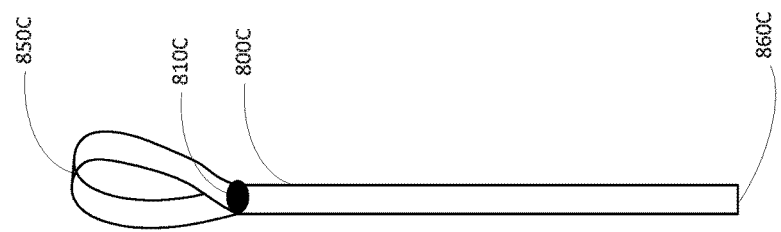
FIGS. 8A-8C are example suspenders in accordance with aspects of the disclosure.
Figure 8B:
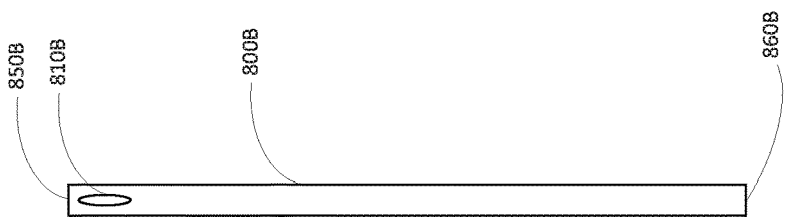
Figure 8A:
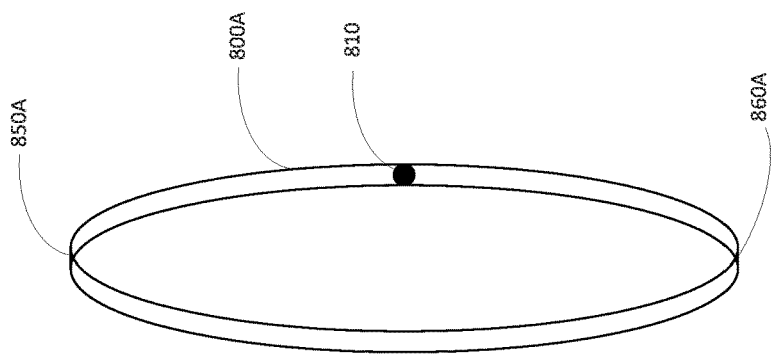

Each suspender may be a single strap folded back and heat sealed to itself to form a loop of material configured to stretch, rather than break, as the envelope material is pulled towards the equator and away from the apex or base during pressurization. For instance, FIG. 8A depicts a suspender 800A which may correspond to suspender 720 or 722. Suspender 800A is configured as a loop having a first end 850A, which may correspond to first ends 750 and/or 752, and an opposite second end 860B, which may correspond to second end 760 and/or 762. In this example, suspender 800A may be formed as a loop by heat sealing a strip of material into the loop at point 810A. By using a loop, the suspender can be sealed to the tubing and easily looped around the stud making attachment much simpler than that of a leash or tack point discussed above.

Alternatively, each suspender may be a single strap that is heat sealed to the envelope material at one end, and secured to a stud via an eye or loop in the suspender. FIG. 8B depicts a suspender 800B which may correspond to suspender 720 or 722. Suspender 800B is configured as a loop having a first end 850B, which may correspond to first ends 750 and/or 752, and an opposite second end 860B, which may correspond to second end 760 and/or 762. In this example, suspender 800B may be include an eye 810B formed by cutting or punching out the eye at the first end 850B. FIG. 8C depicts a suspender 800C which may correspond to suspender 720 or 722. Suspender 800C is configured as a strip with a loop at first end 850C, which may correspond to first ends 750 and/or 752, and an opposite second end 860C, which may correspond to second end 760 and/or 762. In this example, the loop may be formed by heat sealing the strip of material to itself at point 810C.

The suspenders may be made polyethylene film which is the same as or similar to that of the material of the envelope film. Alternatively, the suspenders may be made of any other low temperature, ductile viscoelastic material, including urethanes, other olefins, silicone compounds, etc.

Returning to the examples of FIGS. 7A and 7B, suspenders 720, 722 are located proximate to the top plate system 201 and base plate system 202, respectively. Suspender 720 holds a portion 701 of gathered envelope film 700 towards the top plate system 201 and away from the equator via the first end 750 at the mounting point 740 and second end 760 which may be heat sealed to the envelope film 700, for instance in the middle of a gore or on a tubular sleeve of a tendon. Suspender 722 holds a portion 702 of gathered envelope film 700 towards the base plate system 202 and away from the equator via the first end 752 at the mounting point 742 and second end 762 which may be heat sealed to the envelope film 700, for instance in the middle of a gore or on a tubular sleeve of a tendon.

During pressurization, the envelope film may be pulled towards the equator. The force on the suspenders may cause the suspenders to stretch towards the equator rather than break. When fully pressurized, the suspenders may lie flat against the envelope film. For instance, turning to FIG. 9, the portions 701, 702 are pulled relative to and along the tendon 230 towards the equator in the directions of arrows 910 and 912, respectively, and are indistinguishable from the rest of the envelope film 700. At the same time, the second ends 760, 762 are pulled towards the equator and away from the apex and base, respectively. At the same time, second ends 760, 762 are pulled towards the base and apex, respectively.

Figure 9:
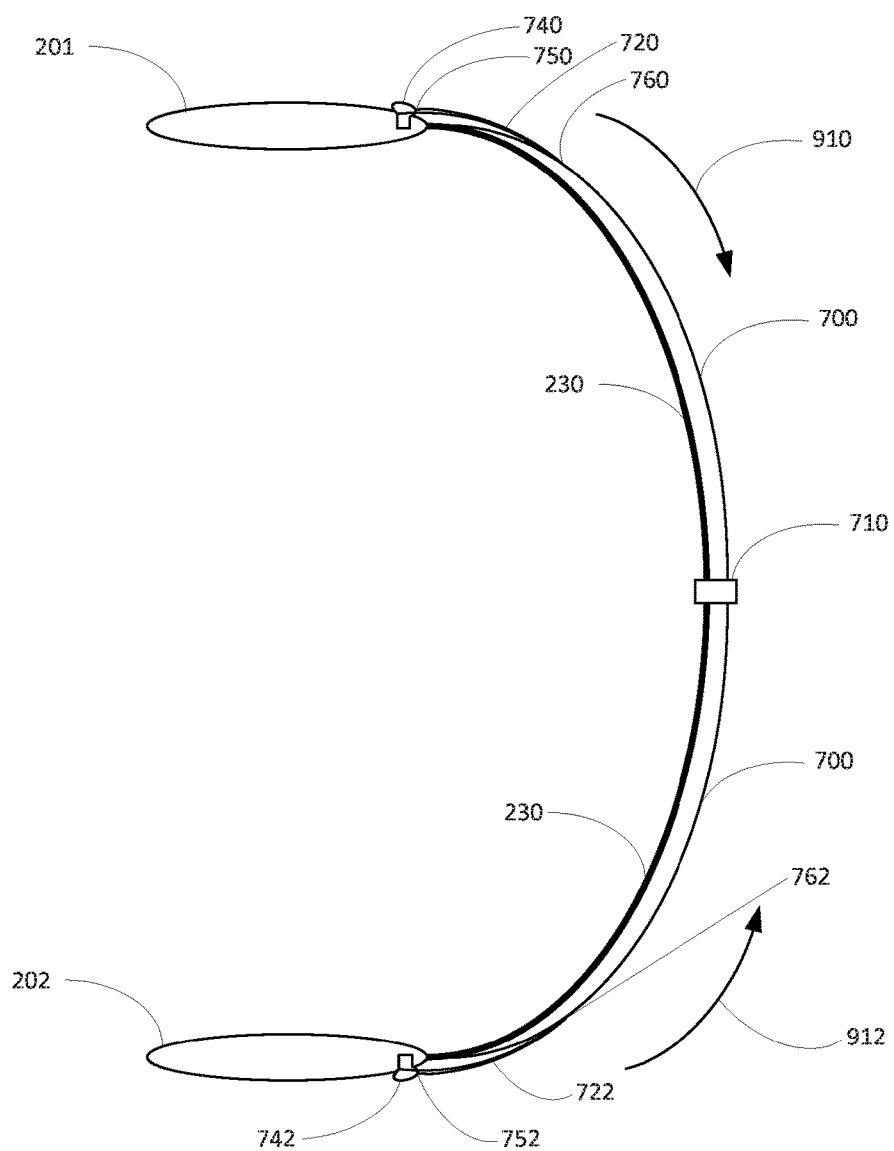
FIG. 9 is an example representation of a top plate system and base plate system with a tendon and a pair of suspenders for a pressurized balloon envelope in accordance with aspects of the disclosure.

Again, because the envelope film tends to be pulled towards the equator of the balloon during pressurization, the envelope film is more likely to be distributed evenly along the tendon 230. For instance, FIG. 9 depicts the example of FIGS. 7A and 7B where envelope film 700 is pressurized. Both suspenders 720 and 722 have stretched towards the equator may lie flat against the envelope film 700. As can be seen first ends 750, 752 remain attached to the top plate system 201 and base plate system 202, respectively, and second ends 760, 762 remain attached to the base plate system, respectively.

The geometry of the suspenders may be varied according to the amount of stretch required for the application. For instance, a suspender may be a strip of film approximately 1 meter long or more or less, 1-2 mil thick or more or less, and 1 inch wide or more or less. In addition, the configuration of the suspenders may or may not be symmetrical, or rather, the same at the top plate system and the base plate system. Although the examples above refer to straps or loops, the suspenders may take a variety of different shapes including straight, curved, or flared to properly and consistently distribute the load between the two endpoints.

Figure 10:
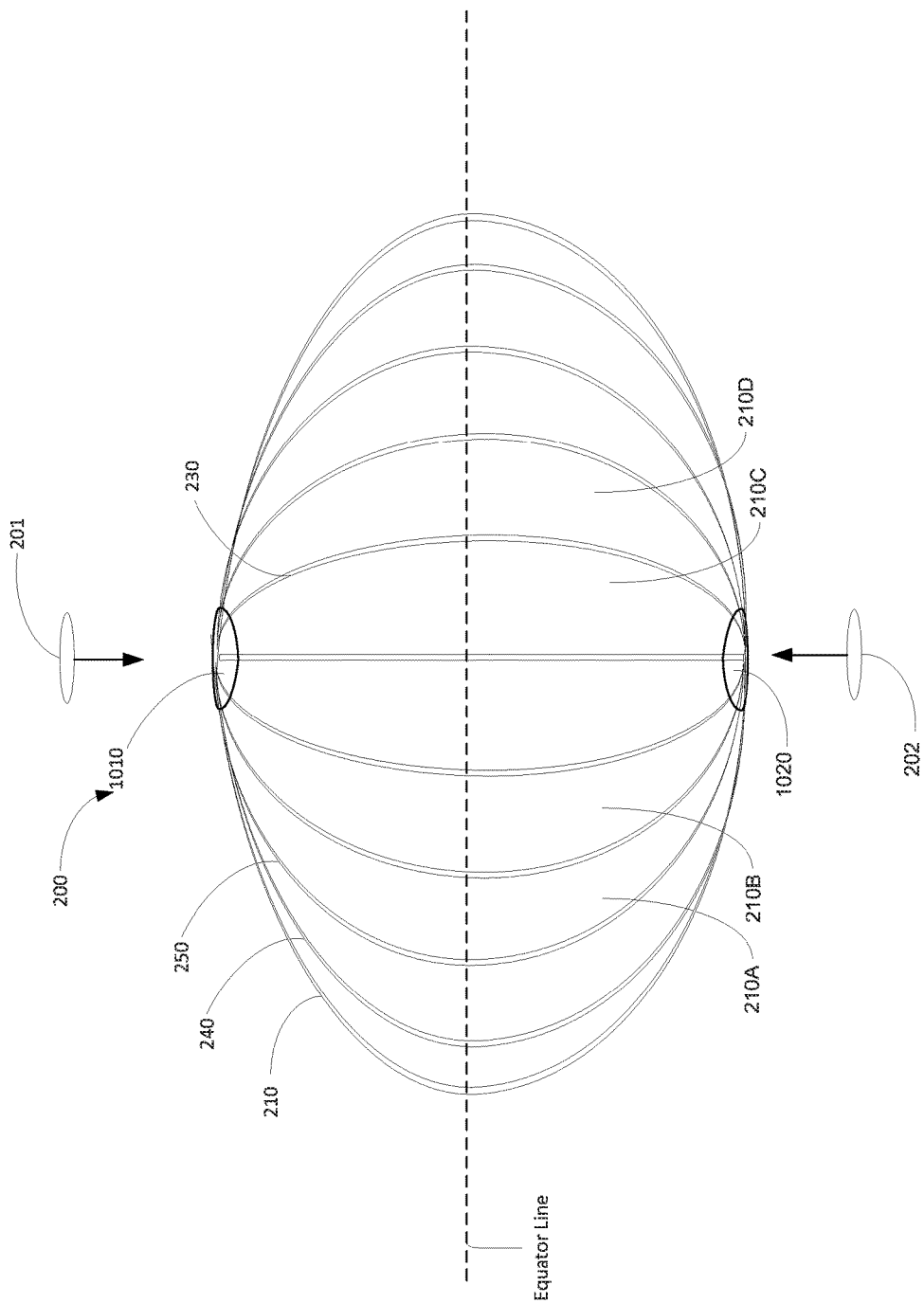
FIG. 10 is an example balloon envelope, top plate system and base plate system in accordance with aspects of the disclosure.

As an alternative to the mounting point examples, the first ends of the suspenders may be attached to a doubler film arranged near the apex or base of the balloon envelope. For instance, as shown in FIG. 10, doubler film 1010, 1020 may each be a circular piece of the envelope film used to "cap" off the gores of the balloon envelope at the top and base of the gores. These doubler films may be heat sealed to the gores 210A, 210B, 210C, 210D, etc. Thereafter, the top plate system 201 may be attached to the balloon envelope at the double film 1010, for instance by heat sealing the doubler film and top plate system, and the base plate system 202 may be attached to the balloon envelope at the double film 1020, for instance by heat sealing the doubler film and top plate system. In this example, rather than being attached to a mounting point of the top plate system or base plate system, the second ends of the suspenders may be heat sealed to the envelope film. When the doubler film 1010 or 1020 is installed, a heat seal may be executed between the gores, the first ends of the suspenders, and the doubler film 1010 or 1020. Thereafter, each of the top plate system 201 and base plate system 202 may be heat sealed to the envelope film at the double films 1010, 1020, respectively.

Figure 11:
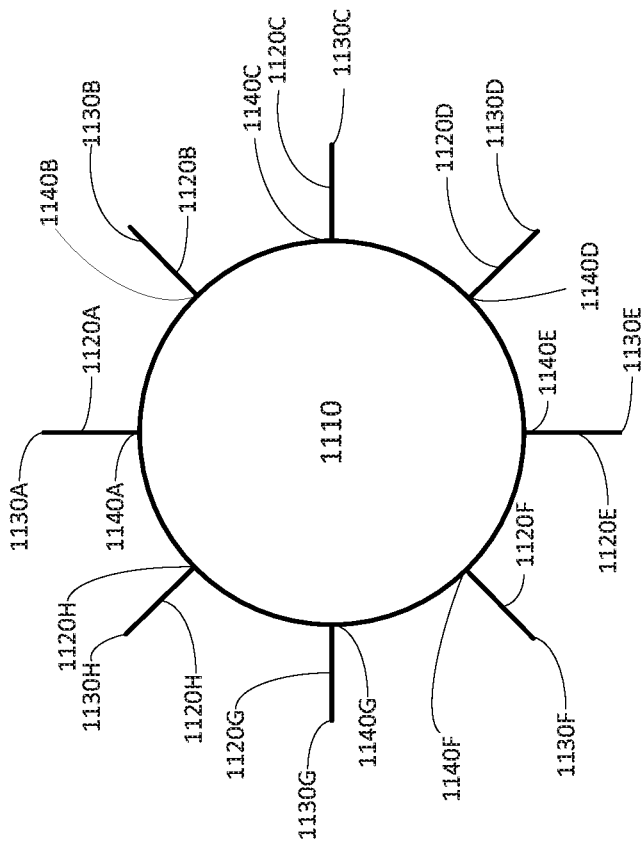
FIG. 11 is an example doubler film with suspenders in accordance with aspects of the disclosure.

In another instance, the doubler film may be pre-built with suspenders sealed onto the doubler film or cut into the doubler film as a single complex shape. FIG. 11 is an example double film 1110 with a plurality of suspenders 1120A-1120H. Although only 6 suspenders are depicted for clarity, the number of suspenders may be equal to or less than the number of gores of the balloon envelope. The first ends 1130A-1130H of these suspenders may be attached to the double film 1110 via a heat seal. Alternatively, these first ends may be incorporated into the double film 1110, for instance, being cut into the shape depicted in FIG. 11 from a large piece of film material. The second ends 1140A-1140AH each extend away or are extensions from from the doubler film 1110. The doubler film is then attached to the gores with no extra film in the balloon envelope, and thereafter the suspenders may be attached to the envelope film as discussed above.

Figure 12:
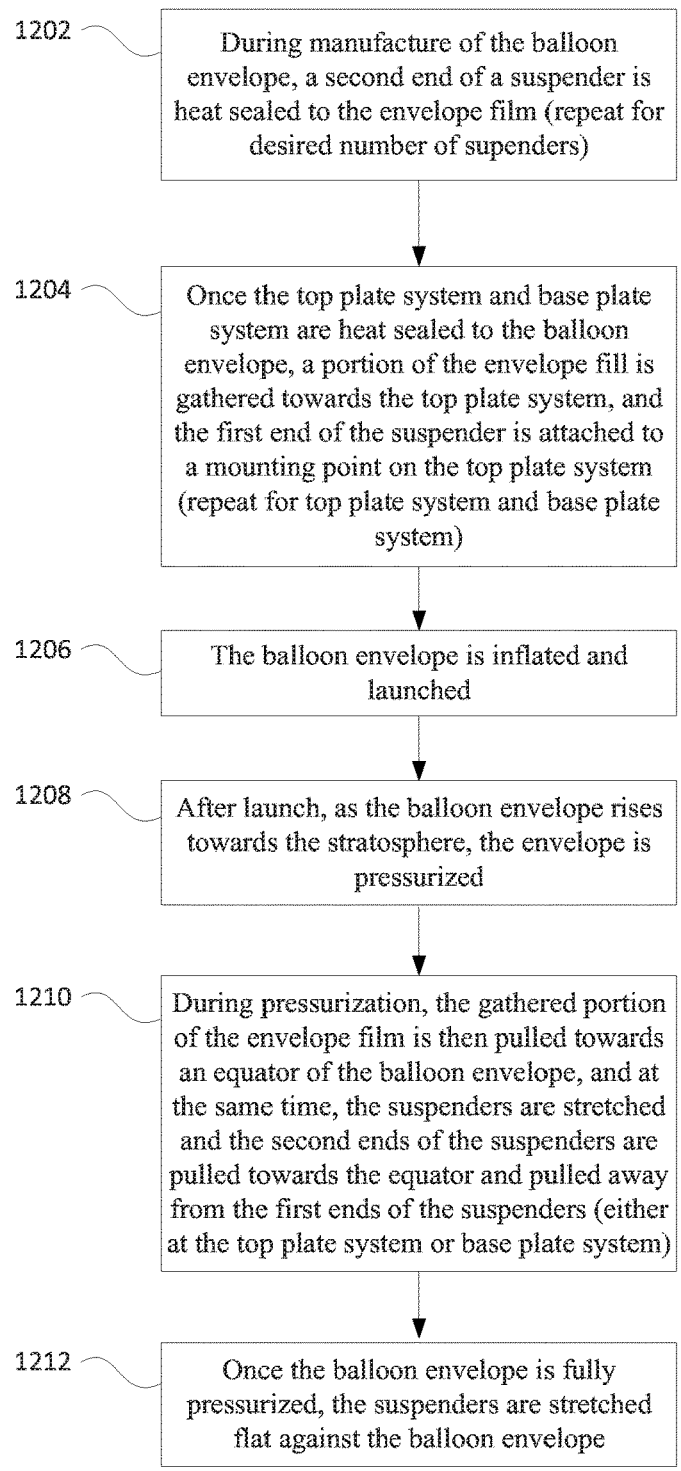
FIG. 12 is an example flow diagram in accordance with aspects of the disclosure.

FIG. 12 is an example flow diagram 1200 for an example assembly and use of the suspenders. In this example, at block 1202 during manufacture of the balloon envelope, a second end of a suspender is heat sealed to the envelope film, for instance in the center of a gore or on a tubular sleeve of a tendon. This may be repeated for the desired number of tendons for each of what will become the apex and the base of the balloon envelope. At block 1204, once the top plate system and base plate system are heat sealed to the balloon envelope, a portion of the envelope fill may be gathered towards the top plate system, and the first end of the suspender may be attached to a mounting point on the top plate system. This may be repeated for the each of the remaining suspenders for each of the top plate system and base plate system. At block 1206, the balloon envelope may be inflated, for instance using a lift gas supply attached to a fill port of the top plate system, and launched, or rather released and allowed to float. At block 1208, after launch, as the balloon envelope rises towards the stratosphere, the envelope may begin to pressurize. At block 1210, during pressurization, the gathered portion of the envelope film may then be pulled towards an equator of the balloon envelope. At the same time, the suspenders stretch and the second ends of the suspenders are pulled towards the equator and pulled away from the first ends of the suspenders (either at the top plate system or base plate system). At block 1212, once the balloon envelope is fully pressurized, the suspenders may remain stretched flat against the balloon envelope.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system comprising:
  a balloon envelope including envelope film;
  at least one tendon; and
  a suspender having a first end attached to the envelope film, the suspender being configured to stretch such that the first end moves towards an equator of the balloon envelope as the balloon envelope pressurizes in order to control movement of the envelope film both relative to the tendon and towards the equator as the balloon pressurizes.

2. The system of claim 1, wherein the first end is arranged to move away from an apex of the balloon envelope when the first end is moving towards the equator.

3. The system of claim 2, further comprising:
  a second tendon; and
  a second suspender having a first end attached to the envelope film, the second suspender being configured to stretch such that the first end of the second suspender moves towards the equator of the balloon envelope as the balloon envelope pressurizes in order to control movement of the envelope film both-relative to the second tendon and towards the equator as the balloon pressurizes.

4. The system of claim 3, wherein the second end of the second suspender is arranged to move towards the apex of the balloon envelope when the first end of the second suspender is moving towards the equator.

5. The system of claim 4, further comprising a base plate system arranged at a base of the balloon envelope, and wherein a second end of the second suspender is attached to the base plate system.

6. The system of claim 5, wherein the base plate system includes a mounting point, and wherein the second end of the second suspender is attached to the mounting point.

7. The system of claim 6, wherein the second end of the second suspender is configured to loop around the mounting point.

8. The system of claim 6, wherein the mounting point is a stud.

9. The system of claim 8, wherein the second tendon is attached to the stud.

10. The system of claim 1, wherein at least one point on the tendon is fixed relative to the envelope film.

11. The system of claim 10, wherein the at least one point is adjacent to a midpoint of the tendon.

12. The system of claim 1, wherein the envelope film includes a sleeve arranged over the tendon, and wherein the first end is attached to the sleeve.

13. The system of claim 1, further comprising a top plate system, and wherein a second end of the suspender is attached to the top plate system.

14. The system of claim 13, wherein the top plate system includes a mounting point, and wherein the second end of the suspender is configured to loop around the mounting point.

15. The system of claim 14, wherein the mounting point is a stud.

16. The system of claim 15, wherein the tendon is attached to the stud.

17. The system of claim 13, wherein the suspender is configured to hold a gathered portion of the envelope film towards the top plate system and away from the equator prior to pressurization.

18. The system of claim 17, wherein the suspender is configured to allow the gathered portion of the balloon envelope film to move towards the equator during pressurization.

19. The system of claim 1, the balloon envelope includes a plurality of gores and a doubler film attached to the plurality of gores, and wherein a second end of the suspender is attached to the doubler film.

20. The system of claim 1, wherein the balloon envelope includes a plurality of gores and a doubler film attached to the plurality of gores, and wherein the suspender is an extension from the doubler film.

* * * * *